United States Patent
Ohsawa (10) Patent No.: US 11,646,420 B2
(45) Date of Patent: May 9, 2023

(54) POSITIVE ELECTRODE MATERIAL OF SECONDARY BATTERY, AND SECONDARY BATTERY

(71) Applicant: TOYOTA JIDOSHA KABUSHIKI KAISHA, Toyota (JP)

(72) Inventor: Ryosuke Ohsawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 83 days.

(21) Appl. No.: 17/159,333

(22) Filed: Jan. 27, 2021

(65) Prior Publication Data

US 2021/0249660 A1 Aug. 12, 2021

(30) Foreign Application Priority Data

Feb. 10, 2020 (JP) .............................. JP2020-020498

(51) Int. Cl.
| | |
|---|---|
| *H01M 4/60* | (2006.01) |
| *H01M 4/36* | (2006.01) |
| *H01M 10/05* | (2010.01) |
| *H01M 4/38* | (2006.01) |
| *H01M 10/0525* | (2010.01) |
| *H01M 4/02* | (2006.01) |

(52) U.S. Cl.
CPC ........... *H01M 4/602* (2013.01); *H01M 4/386* (2013.01); *H01M 10/0525* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 2006/0134521 A1 | 6/2006 | Shima | |
| 2015/0263382 A1* | 9/2015 | Singh | ................ H01M 10/0565 429/313 |
| 2016/0079590 A1 | 3/2016 | Roev et al. | |
| 2018/0108940 A1 | 4/2018 | Kwon et al. | |

(Continued)

FOREIGN PATENT DOCUMENTS

| | | |
|---|---|---|
| JP | 2002319405 A | 10/2002 |
| JP | 2005123179 A | 5/2005 |

(Continued)

*Primary Examiner* — Maria Laios
*Assistant Examiner* — Angela J Martin
(74) *Attorney, Agent, or Firm* — Oliff PLC (57) ABSTRACT

Provided is a positive electrode material that allows reducing the low-temperature resistance of a secondary battery. The positive electrode material of a secondary battery includes positive electrode active material particles each having a void in the interior, and a compound (A) that is present at least within the void. The average diameter of the void is not less than 0.01 μm and not more than 1 μm. The compound (A) is a nitrile group-containing polymer, and the proportion of nitrogen atoms, relative to metal atoms included in the positive electrode active material particles, other than lithium, is not less than 1 atom % and not more than 10 atom %; alternatively, the compound (A) is an alkoxysilane compound, and then the proportion of silicon atoms, relative to metal atoms included in the positive electrode active material particles, other than lithium, is not less than 1 atom % and not more than 10 atom %.

3 Claims, 3 Drawing Sheets

(56) References Cited

U.S. PATENT DOCUMENTS

| | | | |
|---|---|---|---|
| 2019/0363350 A1* | 11/2019 | Weber | H01M 4/0402 |
| 2021/0013543 A1* | 1/2021 | Imai | H01M 10/0585 |
| 2021/0098778 A1* | 4/2021 | He | H01M 4/364 |

FOREIGN PATENT DOCUMENTS

| | | | |
|---|---|---|---|
| JP | 2013051078 A | 3/2013 |
| JP | 6564064 B2 | 8/2019 |

* cited by examiner

POSITIVE ELECTRODE MATERIAL OF SECONDARY BATTERY, AND SECONDARY BATTERY

BACKGROUND OF THE INVENTION

1. Field of the Invention

The present disclosure relates to a positive electrode material of a secondary battery. The present disclosure also relates to a secondary battery that includes the above positive electrode material. The present application claims the benefit of foreign priority to Japanese Patent Application No. 2020-020498, filed on Feb. 10, 2020, the entire contents of which are incorporated herein by reference.

2. Description of the Related Art

In recent years, secondary batteries such as lithium secondary batteries have come to being suitably used as portable power sources in personal computers, mobile terminals and the like, and as power sources for vehicle drive in electric vehicles (EV), hybrid vehicles (HV) and plug-in hybrid vehicles (PHV).

Generally, positive electrode active materials capable of occluding and releasing ions that serve as charge carriers are used in the positive electrodes of lithium secondary batteries. Such positive electrode active materials are ordinarily in the form of secondary particles resulting from aggregation of primary particles, such that the secondary particles have gaps between the primary particles. Accordingly, the positive electrode active material particles have ordinarily voids in the interior. Various approaches have been tried in order to enhance the performance of such positive electrode active materials (see, for instance, Japanese Patent No. 6564064 and Japanese Patent Application Publication No. 2013-051078).

SUMMARY OF THE INVENTION

As a result of diligent research, the inventors have found that regarding a positive electrode active material having a void in the interior thereof, reducing low-temperature resistance of a secondary battery is insufficient.

It is therefore an object of the present disclosure to provide a positive electrode material that allows reducing the low-temperature resistance of a secondary battery.

The positive electrode material of a secondary battery disclosed herein includes positive electrode active material particles each having a void in the interior; and a compound (A) present at least within the void. The average diameter of the void is not less than 0.01 µm and not more than 1 µm. The compound (A) is a nitrile group-containing polymer, and then the proportion of nitrogen atoms included in the nitrile group-containing polymer, relative to metal atoms included in the positive electrode active material particles, other than lithium, is not less than 1 atom % (at %) and not more than 10 atom %; alternatively, the compound (A) is an alkoxysilane compound, and then the proportion of silicon atoms included in the alkoxysilane compound, relative to metal atoms included in the positive electrode active material particles, other than lithium, is not less than 1 atom % and not more than 10 atom %.

By virtue of the above features, a positive electrode material can be provided that allows reducing the low-temperature resistance of a secondary battery.

In a desired mode of the positive electrode material of a secondary battery disclosed herein, the positive electrode material is a positive electrode material of a lithium secondary battery.

The effect of reducing low-temperature resistance is particularly pronounced in such a configuration.

In another aspect, a secondary battery disclosed herein has a positive electrode, a negative electrode, and a nonaqueous electrolyte. The positive electrode contains the above positive electrode material.

Such a configuration affords a secondary battery the low-temperature resistance of which is low.

In a desired mode of the secondary battery disclosed herein, the nonaqueous electrolyte contains a carbonate as a nonaqueous solvent.

Low-temperature resistance is particularly low in such a configuration.

In a desired mode of the secondary battery disclosed herein, the secondary battery is a lithium secondary battery.

Low-temperature resistance is particularly low in such a configuration.

DESCRIPTION OF THE PREFERRED EMBODIMENTS

Embodiments of the present disclosure will be explained below with reference to accompanying drawings. Any features other than the matter specifically set forth herein and that may be necessary for carrying out the disclosure can be regarded as instances of design matter for a person skilled in the art based on conventional art in the relevant technical field. The present disclosure can be realized on the basis of the content disclosed herein and common technical knowledge in the relevant technical field. In the drawings below, members and portions that elicit identical effects are explained while denoted with identical reference symbols. The dimensional relationships (length, width, thickness and so forth) in the drawings do not reflect actual dimensional relationships.

The term "secondary battery" used herein denotes a power storage device in general that can be charged and discharged repeatedly, and encompasses so-called storage batteries and electric storage elements such as electrical double layer capacitors.

The term "lithium secondary battery" used herein denotes a secondary battery that utilizes lithium ions as charge carriers, and that is charged and discharged as a result of movement of charge accompanied with lithium ions, between a positive electrode and a negative electrode.

The positive electrode material of a secondary battery according to the present embodiment includes positive electrode active material particles each having a void in the interior, and a compound (A) present at least within the void. The average diameter of the void is not less than 0.01 μm and not more than 1 μm. Herein the compound (A) is a nitrile group-containing polymer, and then the proportion of nitrogen atoms included in the nitrile group-containing polymer, relative to metal atoms included in the positive electrode active material particles, other than lithium, is not less than 1 atom % and not more than 10 atom %; alternatively, the compound (A) is an alkoxysilane compound, and then the proportion of silicon atoms included in the alkoxysilane compound, relative to metal atoms included in the positive electrode active material particles, other than lithium, is not less than 1 atom % and not more than 10 atom %.

A known positive electrode active material used in secondary batteries, in particular in lithium secondary batteries, may be used as the positive electrode active material that is included, in the form of particles, in the positive electrode material according to the present embodiment. Specifically, for instance a lithium composite oxide or a lithium-transition metal phosphate compound may be used herein. The crystal structure of the positive electrode active material is not particularly limited, and may be, for instance, a layered structure, a spinel structure, an olivine structure or the like.

A lithium-transition metal composite oxide containing at least one from among Ni, Co and Mn as a transition metal element is desirably used as the lithium composite oxide. Concrete examples of lithium-transition metal composite oxides include, for instance, lithium-nickel-based composite oxides, lithium-cobalt-based composite oxides, lithium-manganese-based composite oxides, lithium-nickel-manganese-based composite oxides, lithium-nickel-cobalt-manganese-based composite oxides, lithium-nickel-cobalt-aluminum-based composite oxides, and lithium-iron-nickel-manganese-based composite oxides.

It should be noted that the term "lithium-nickel-cobalt-manganese-based composite oxide" used herein encompasses, besides oxides having Li, Ni, Co, Mn and O as constituent elements, also oxides that include one or two or more additional elements other than the foregoing. Examples of such additional elements include transition metal elements and main group metal elements such as Mg, Ca, Al, Ti, V, Cr, Y, Zr, Nb, Mo, Hf, Ta, W, Na, Fe, Zn and Sn. Furthermore, the additional elements may be metalloid elements such as B, C, Si and P and non-metallic elements such as S, F, Cl, Br and I. This applies also to the above-mentioned lithium-nickel-based composite oxides, lithium-cobalt-based composite oxides, lithium-manganese-based composite oxides, lithium-nickel-manganese-based composite oxides, lithium-nickel-cobalt-aluminum-based composite oxides and lithium-iron-nickel-manganese-based composite oxides.

Desired examples of lithium-nickel-cobalt-manganese-based composite oxides include composite oxides having the composition represented by Formula (I) below.

$$Li_{1+x}Ni_yCo_zMn_{(1-y-z)}Ma_\alpha O_{2-\beta}Q_\beta \qquad (I)$$

In Formula (I), x, y, z, α and β satisfy, 0≤x≤0.7, 0.1<y<0.9, 0.1<z<0.4, 0≤α≤0.1 and 0≤β≤0.5. Further, M is at least one element selected from the group consisting of Zr, Mo, W, Mg, Ca, Na, Fe, Cr, Zn, Sn and Al. Moreover, Q is at least one element selected from the group consisting of F, Cl and Br. From the viewpoint of energy density and thermal stability, y and z desirably satisfy 0.3≤y≤0.5 and 0.20≤z<0.4, respectively.

Examples of lithium-transition metal phosphate compounds include, for instance, lithium iron phosphate (LiFePO$_4$), lithium manganese phosphate (LiMnPO$_4$), and lithium manganese iron phosphate.

Typically, the positive electrode active material particles are in the form of secondary particles in which primary particles are aggregated. The secondary particles have voids derived from gaps between primary particles. Therefore, the positive electrode active material particles have voids in the interior. In such a form, the positive electrode active material particles are porous particles.

The form of the positive electrode active material particles is however not limited thereto, so long as the positive electrode active material particles have voids in the interior. For instance, the voids are not limited to being caused by gaps between primary particles. For example, the positive electrode active material particles may be hollow particles each having a shell formed through shell-like aggregation of primary particles, with one or more voids in the interior of the shell. The shell in this form has a through-hole.

The positive electrode active material particles may also be in the form of primary particles each having a void in the interior.

In the present embodiment, the average diameter of the void in the interior of the positive electrode active material particles is not less than 0.01 μm and not more than 1 μm. When the average diameter of the void lies outside this range, the low-temperature resistance of the secondary battery increases, and also the high-temperature cycle characteristics of the battery worsen.

It should be noted that the average diameter of the void can be determined, for instance, as follows. A cross-sectional electron micrograph of positive electrode active material particles is acquired using a transmission electron microscope (TEM) or the like, the circle equivalent diameters of the voids thereupon are determined using image analysis software (for example ImageJ-fiji), and the average value of the circle equivalent diameters is then calculated as the average diameter of the void.

The average particle size (D50) of the positive electrode active material particles is not particularly limited, and is, for instance, not less than 0.05 μm and not more than 20 μm, desirably not less than 0.5 μm and not more than 15 μm, and more desirably not less than 3 μm and not more than 15 μm.

It should be noted that the average particle size (D50) of the positive electrode active material particles can be determined, for instance, by a laser diffraction/scattering method.

It should be noted that in a case where the positive electrode active material particles are in the form of secondary particles in which primary particles are aggregated, then positive electrode active material particles having internal voids with an average void diameter lying in the above ranges are in a form in which primary particles are loosely aggregated.

The positive electrode active material particles having such voids can be produced in accordance with a known method. For instance, the average diameter of the internal voids can be controlled through adjustment of the conditions at the time of production by a crystallization method, of metal hydroxides that are precursors of the lithium composite oxide.

In the present embodiment, the compound (A) is present at least within the voids of the positive electrode active material particles. In the present embodiment either (1) or (2) below are satisfied.

(1) The compound (A) is a nitrile group-containing polymer, and the proportion of nitrogen atoms included in the nitrile group-containing polymer, relative to metal atoms included in the positive electrode active material particles, other than lithium, is not less than 1 atom % and not more than 10 atom %.

(2) The compound (A) is an alkoxysilane compound, and the proportion of silicon atoms included in the alkoxysilane compound, relative to metal atoms included in the positive electrode active material particles, other than lithium, is not less than 1 atom % and not more than 10 atom %.

The form in which the compound (A) is placed within the voids of the positive electrode active material particles is not particularly limited, and for instance, may be a form in which the compound (A) is present as granules, or a form in which the compound (A) is present in layers. More specifically, for instance, each of the voids of the positive electrode active material particles has a thin layer of the compound (A) with a thickness of nanometers (for instance, 1 nm to 10 nm) thereon.

The compound (A) may be present also on the outer surface of the positive electrode active material particles. Desirably 25 mass % or more, more desirably 50 mass % or more, and more desirably 75 mass % or more of the compound (A) is present in the internal voids of the positive electrode active material particles.

The case (1) above will be explained next.

The nitrile group-containing polymer is a polymer containing monomer units having a nitrile group, and may be, for instance, a homopolymer of a monomer having a nitrile group, a copolymer of two or more monomers having a nitrile group, or a copolymer of a monomer having a nitrile group and a monomer not having a nitrile group. The nitrile group-containing polymer is desirably a homopolymer. The nitrile group-containing polymer has high affinity with electrolyte solution components of secondary batteries, in particular with carbonates. Examples of nitrile group-containing polymers include polyacrylonitrile (PAN), polymethacrylonitrile, acrylonitrile-methacrylonitrile copolymers, acrylonitrile-butadiene copolymers, methacrylonitrile-butadiene copolymers, acrylonitrile-styrene copolymers (AS), methacrylonitrile-styrene copolymers, acrylonitrile-styrene-butadiene copolymers (ABS) and methacrylonitrile-styrene-butadiene copolymers. Desired among the foregoing are polyacrylonitrile and polymethacrylonitrile, and more desirably polyacrylonitrile.

The proportion of nitrogen atoms included in the nitrile group-containing polymer, relative to metal atoms included in the positive electrode active material particles, other than lithium, is not less than 1 atom % and not more than 10 atom %. When the proportion of nitrogen atoms lies outside the above range, the low-temperature resistance of the secondary battery increases, and also the high-temperature cycle characteristics of the battery worsen.

The proportion (atom %) of nitrogen atoms included in the nitrile group-containing polymer relative to metal atoms included in the positive electrode active material particles, other than lithium, can be determined, for instance, by X-ray photoelectron spectroscopy (XPS).

The case (2) above will be explained next.

The alkoxysilane compound is a compound having a structure in which, from among the four bonds of the silicon atom (Si), one to three bonds are bonded to the alkoxy group, and the remaining bonds are bonded to an organic substituent. The alkoxysilane compound has high affinity with electrolyte solution components of secondary batteries, in particular with carbonates.

Examples of the alkoxy group contained in the alkoxysilane compound include, for instance, methoxy groups, ethoxy groups, propoxy groups, butoxy groups, pentyloxy groups and hexyloxy groups. The alkoxy group is desirably a methoxy group or ethoxy group, more desirably a methoxy group.

Desirably, the number of alkoxy groups in the alkoxysilane compound is 3. Desirably, the alkoxysilane compound is a trimethoxysilane compound or a triethoxysilane compound.

Examples of the organic substituent contained in the alkoxysilane compound include alkyl groups, cycloalkyl groups, phenyl groups, benzyl groups and tolyl groups. Desired among the foregoing are alkyl groups having 1 to 4 carbon atoms, more desirably alkyl groups having 1 or 2 carbon atoms, and yet more desirably methyl groups.

Suitable alkoxysilane compounds include methyltrimethoxysilane, ethyltrimethoxysilane, methyltriethoxysilane and ethyltriethoxysilane. Desired among the foregoing is methyltrimethoxysilane.

The proportion of silicon atoms included in the alkoxysilane compound, relative to metal atoms included in the positive electrode active material particles, other than lithium, is not less than 1 atom % and not more than 10 atom %. When the proportion of silicon atoms lies outside this range, the low-temperature resistance of the secondary battery increases, and also the high-temperature cycle characteristics of the battery worsen.

The proportion (atom %) of silicon atoms included in the alkoxysilane compound relative to metal atoms included in the positive electrode active material particles, other than lithium, can be determined, for instance, by X-ray photoelectron spectroscopy (XPS).

Figure 1:
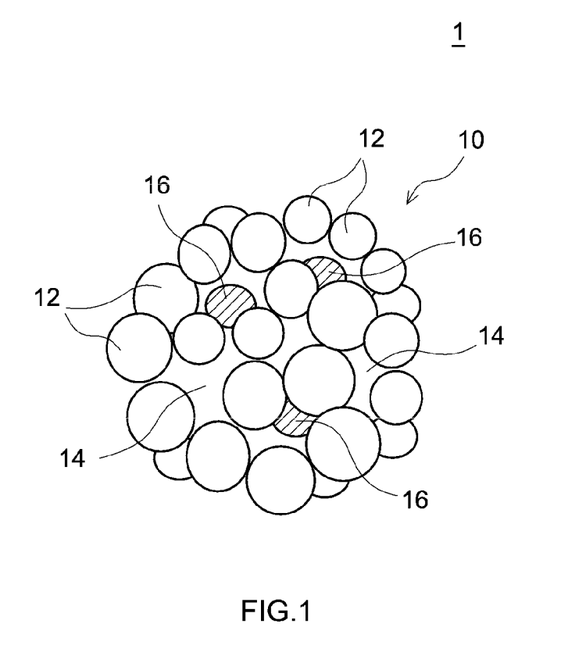
FIG. 1 is a schematic cross-sectional diagram of an example of a positive electrode material according to an embodiment of the present disclosure.

FIG. 1 illustrates schematically a cross section of an example of a positive electrode material according to an embodiment. In FIG. 1, a positive electrode material 1 contains positive electrode active material particles 10, and a compound (A) 16. Typically, the positive electrode active material particle 10 is in the form of a secondary particle resulting from aggregation of primary particles 12. The primary particles 12 are aggregated comparatively loosely, and as a result the positive electrode active material particle 10 has voids 14 in the interior. The compound (A) 16 is disposed in the voids 14. The compound (A) satisfies (1) or (2) above.

It should be noted that the method for allowing the compound (A) to be present in the internal voids of the positive electrode active material particles is not particularly limited. Ordinarily, however, an operation of actively introducing the compound (A) into the internal voids of the positive electrode active material particles is performed, to cause the compound (A) to be present in the internal voids of the positive electrode active material particles, in such a manner that the proportion of nitrogen atoms included in the nitrile group-containing polymer or silicon atoms included in the alkoxysilane compound, relative to metal atoms other than lithium, is not less than 1 atom % and not more than 10 atom %. Desired methods to that end include mechanochemical processing of the compound (A) and the positive electrode active material particles each having a void in the interior.

In the positive electrode material according to the present embodiment, the compound (A) is present by being for instance adhered to, or composited with, at least the internal voids of the positive electrode active material particles. The positive electrode material according to the present embodiment is therefore in particulate form.

The positive electrode material according to the present embodiment is used for secondary batteries; herein, a secondary battery can be constructed using the positive electrode material according to the present embodiment, in accordance with a known method.

The positive electrode material according to the present embodiment allows reducing the low-temperature resistance of a secondary battery. Conceivable underlying reasons for this include the following.

Conventionally, in positive electrode active material particles in the form of secondary particles in which primary particles are aggregated, these primary particles aggregate densely, and as a result gaps between primary particles are small. In consequence, the diameter of voids in the interior of the positive electrode active material particles is small, and an electrolyte solution does not penetrate readily into the voids, when the positive electrode active material particles are used in a secondary battery. In particular, the viscosity of the electrolyte solution is higher at low temperatures, and accordingly the electrolyte solution penetrates yet less readily into the voids. As a result, the reaction surface area of the positive electrode active material particles decreases, in particular at low temperatures. In the present embodiment, however, the voids in the interior of the positive electrode active material particles are comparatively large, and moreover the compound (A) is present within the voids. Polar solvents such as carbonates are used in electrolyte solutions of secondary batteries, while the present compound (A) (i.e. the nitrile group-containing polymer or alkoxysilane compound) has high affinity with electrolyte solutions of secondary batteries. In the present embodiment, therefore, the electrolyte solution can penetrate into the voids in the interior of the positive electrode active material particles, even at low temperatures (for instance, about −10° C.). In consequence, battery reactions occur also at the surface of the voids in the interior of the positive electrode active material particles, and the reaction surface area increases accordingly. The battery resistance at low temperature decreases as a result.

This effect of reducing the low-temperature resistance is particularly pronounced in a case where the secondary battery is a lithium secondary battery.

The positive electrode material according to the present embodiment allows improving high-temperature cycle characteristics of the secondary battery (for instance, resistance to capacity degradation upon repeated charging and discharging at high temperature).

In another aspect, therefore, the secondary battery disclosed herein has a positive electrode, a negative electrode, and a nonaqueous electrolyte. The positive electrode contains the positive electrode material of a secondary battery according to the present embodiment, explained above. The nonaqueous electrolyte desirably contains a carbonate as a nonaqueous solvent.

Hereafter a concrete configuration example of a secondary battery will be explained with reference to accompanying drawings. A lithium secondary battery will be explained as the configuration example below, since the low-temperature resistance thereof can be lower.

Figure 2:
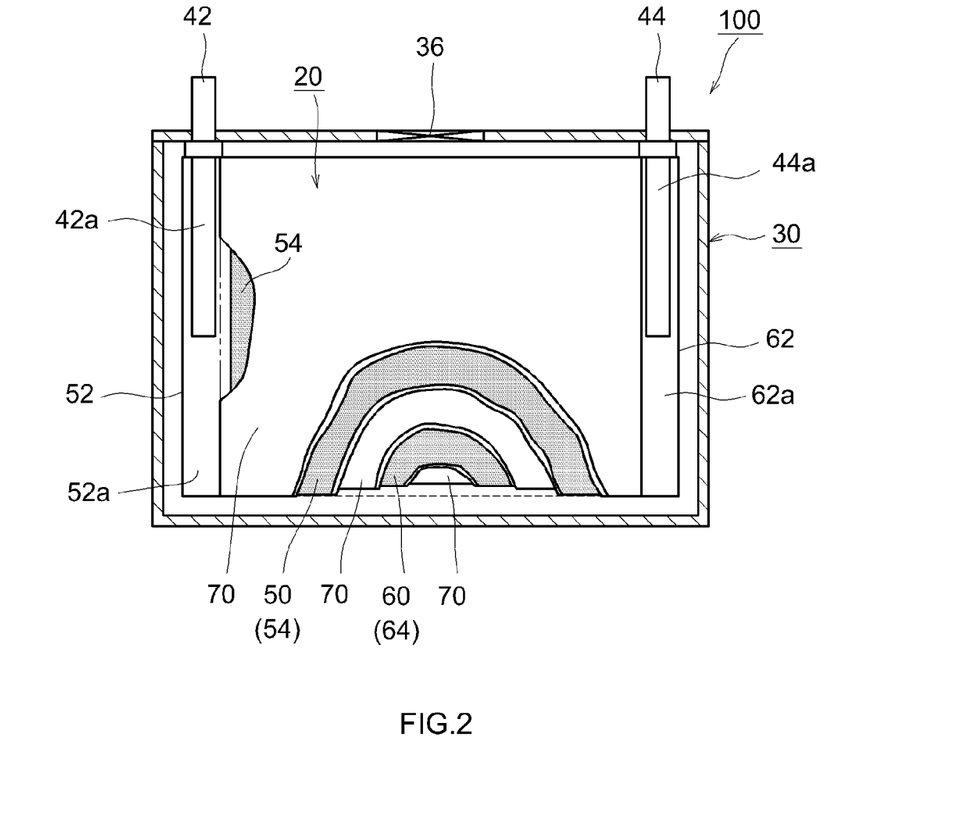
FIG. 2 is a cross-sectional diagram illustrating schematically the configuration of a lithium secondary battery constructed using a positive electrode material according to an embodiment of the present disclosure.

A lithium secondary battery 100 illustrated in FIG. 2 is a sealed battery constructed by accommodating a flat wound electrode body 20 and a nonaqueous electrolyte (not shown) in a flat square battery case (i.e. outer container) 30. The battery case 30 is provided with a positive electrode terminal 42 and a negative electrode terminal 44 for external connection, and with a thin-walled safety valve 36 set so as to relieve internal pressure in the battery case 30 when the internal pressure rises to or above a predetermined level. The positive and negative electrode terminals 42, 44 are electrically connected to positive and negative electrode collector plates 42a, 44a, respectively. For instance, a lightweight metallic material of good thermal conductivity, such as aluminum, is used as the material of the battery case 30.

Figure 3:
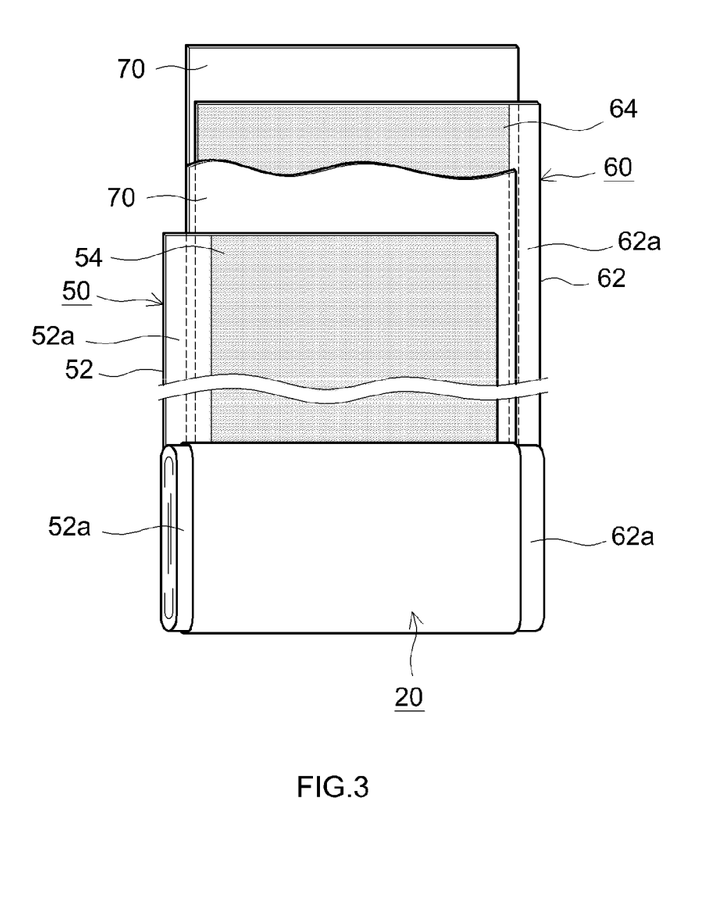
FIG. 3 is a cross-sectional diagram illustrating schematically the configuration of a wound electrode body of a lithium secondary battery, constructed using a positive electrode material according to an embodiment of the present disclosure.

As illustrated in FIG. 2 and FIG. 3, the wound electrode body 20 has a form in which a positive electrode sheet 50 and a negative electrode sheet 60 are superimposed on each other and wound, in the longitudinal direction, with two elongate separator sheets 70 interposed in between. The positive electrode sheet 50 has a configuration wherein a positive electrode active material layer 54 is formed along the longitudinal direction, on one or both faces (both faces in this case) of an elongate positive electrode collector 52. The negative electrode sheet 60 has a configuration wherein a negative electrode active material layer 64 is formed along the longitudinal direction on one or both faces (both faces in this case) of an elongate negative electrode collector 62. A positive electrode active material layer non-formation section 52a (i.e. exposed portion of the positive electrode collector 52 at which the positive electrode active material layer 54 is not formed) and a negative electrode active material layer non-formation section 62a (exposed portion of the negative electrode collector 62 at which the negative electrode active material layer 64 is not formed) are formed so as to protrude outward from both edges of the wound electrode body 20 in the winding axis direction thereof (i.e. a sheet width direction perpendicular to the longitudinal direction). The positive electrode collector plate 42a and the negative electrode collector plate 44a are joined to the positive electrode active material layer non-formation section 52a and the negative electrode active material layer non-formation section 62a, respectively.

Examples of the positive electrode collector 52 that makes up the positive electrode sheet 50 include, for instance, aluminum foil. The positive electrode active material layer 54 contains the above-described positive electrode material according to the present embodiment being a material that contains a positive electrode active material. The positive electrode active material layer 54 can further contain, for instance, a conductive material and a binder. For instance, carbon black such as acetylene black (AB) or some other carbon material (for instance, graphite) can be suitably used as the conductive material. For instance, polyvinylidene fluoride (PVDF) or the like can be used as the binder.

Examples of the negative electrode collector 62 that makes up the negative electrode sheet 60 include, for instance, copper foil. The negative electrode active material layer 64 contains a negative electrode active material. For instance, a carbon material such as graphite, hard carbon or soft carbon can be used as the negative electrode active material. The negative electrode active material layer 64 can further contain, for instance, a binder and a thickener. For instance, styrene butadiene rubber (SBR) or the like can be used as the binder. For instance, carboxymethyl cellulose (CMC) or the like can be used as the thickener.

Various kinds of porous sheet identical or similar to those conventionally utilized in lithium secondary batteries can be used herein as the separator 70. Examples of porous sheets include porous resin sheets made up of a resin such as polyethylene (PE) or polypropylene (PP). The porous resin sheet may have a single-layer structure or may have a multilayer structure of two or more layers (for instance, a three-layer structure in which a PP layer is laid up on both faces of a PE layer). The separator 70 may be provided with a heat-resistant layer (HRL).

A nonaqueous electrolyte identical or similar to those of conventional lithium secondary batteries can be used as the nonaqueous electrolyte. Typically, a nonaqueous electrolyte can be used that contains a supporting salt in an organic solvent (nonaqueous solvent). Examples of the nonaqueous solvent include, for instance, aprotic solvents such as carbonates, esters, ethers and the like. Desired among the foregoing are carbonates, since these afford a particularly pronounced effect of reducing the low-temperature resistance, elicited by the positive electrode material. Examples of carbonates include ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) and trifluorodimethyl carbonate (TFDMC). Such nonaqueous solvents can be used singly or in appropriate combinations of two or more types. For instance, a lithium salt such as $LiPF_6$, $LiBF_4$, lithium bis(fluorosulfonyl)imide (LiFSI) or the like can be used as the supporting salt. The concentration of the supporting salt is desirably not less than 0.7 mol/L and not more than 1.3 mol/L.

It should be noted that so long as the effect of the present disclosure is not significantly impaired thereby, the above nonaqueous electrolyte can contain components other than the nonaqueous solvent and supporting salt described above, for instance various additives such as a gas generating agent, a film-forming agent, a dispersant, a thickener and the like.

The lithium secondary battery 100 is advantageous in that the low-temperature resistance thereof is low. The lithium secondary battery 100 is also advantageous in that the high-temperature cycle characteristics thereof (for instance, resistance to capacity degradation upon repeated charging and discharging at high temperature) are high.

The lithium secondary battery 100 can be used for various applications. Desired applications include power sources for vehicle drive mounted on vehicles such as plug-in hybrid vehicles (PHV), hybrid vehicles (HV) and electric vehicles (EV). The lithium secondary battery 100 can be used in the form of a battery pack resulting from electrically connecting a plurality of the lithium secondary batteries 100.

A square lithium secondary battery having a flat wound electrode body has been explained above as an example. However, the positive electrode material according to the present embodiment can also be used in other types of lithium secondary batteries, in accordance with known methods. For instance, a lithium secondary battery provided with a stacked-type electrode body can be constructed using the positive electrode material according to the present embodiment. Also, a cylindrical lithium secondary battery, a coin-type lithium secondary battery, a laminate-type lithium secondary battery or the like can likewise be constructed using the positive electrode material according to the present embodiment. Further, a secondary battery other than a lithium secondary battery can be constructed using the positive electrode material according to the present embodiment, in accordance with a known method.

Examples pertaining to the present disclosure will be explained next, but the disclosure is not meant to be limited to these examples.

Production of Positive Electrode Material

Example 1

A starting aqueous solution containing nickel sulfate, cobalt sulfate and manganese sulfate at a molar ratio of 1:1:1 was prepared. Parallelly, a reaction solution, the pH of which had been adjusted using sulfuric acid and aqueous ammonia, was prepared, in a reaction vessel. Further, a pH adjustment solution was prepared in the form of a mixture of a sodium carbonate aqueous solution and an ammonium carbonate aqueous solution.

The starting aqueous solution was added, at a predetermined rate, to the reaction solution, under stirring and while controlling the pH using the pH adjustment solution. Crystallization was terminated once a predetermined length of time had elapsed. The obtained crystallized product was washed with water, and was filtered and dried, to yield precursor particles which were hydroxide particles.

The obtained precursor particles and lithium carbonate were mixed so that the molar ratio of lithium relative to the total of nickel, cobalt and manganese was 1:1. This mixture was fired at 950° C. for 10 hours, to yield particles of a lithium composite oxide ($LiNi_{1/3}Co_{1/3}Mn_{1/3}O_2$) having a layered structure which were positive electrode active material particles. These positive electrode active material particles were porous particles in the form of secondary particles resulting from aggregation of primary particles, and in consequence had voids in the interior.

Next, the positive electrode active material particles and polyacrylonitrile were introduced, at a molar ratio of 99:1, in a dry-particle compositing apparatus "Nobilta NOB-MINI" (by Hosokawa Micron Corporation). Mechanochemical processing at 5000 rpm for 10 minutes was next carried out using this apparatus, to yield a positive electrode material of Example 1.

Comparative Example 1

Herein $LiNi_{1/3}Co_{1/3}Mn_{1/3}O_2$ particles were produced in accordance with a conventional method, and the particles were used, as they were, as the positive electrode material of Comparative example 1. These particles were in the form of secondary particles resulting from aggregation of primary particles, and had smaller internal voids than those of Example 1.

Comparative Example 2

The positive electrode active material particles produced in Example 1 were used, as they were, as the positive electrode material of Comparative example 2.

Example 2 and Comparative Example 3

The positive electrode materials of Example 2 and Comparative example 3 were obtained in accordance with the same method as in Example 1, but changing herein the mixing ratios of the positive electrode active material particles and polyacrylonitrile.

Examples 3 and 4, and Comparative Example 4

The positive electrode materials of Examples 3 and 4, and Comparative example 4, were obtained in accordance with the same method as in Example 1, but using herein methyltrimethoxysilane, at predetermined mixing ratios, instead of polyacrylonitrile.

Example 5

Positive electrode active material particles ($LiNi_{1/3}Co_{1/3}Mn_{1/3}O_2$ having a layered structure) having a larger internal void diameter were produced in accordance with the same method as in Example 1, but changing herein the addition rate of the starting aqueous solution, the pH, the stirring speed and the reaction time during production of the precursor particles.

A positive electrode material of Example 5 was obtained in the same way as in Example 1, but using herein these positive electrode active material particles.

Comparative Example 5

The positive electrode active material particles produced in Example 5 were used, as they were, as the positive electrode material of Comparative example 5.

Example 6 and Comparative Example 6

The positive electrode materials of Example 6 and Comparative example 6 were obtained in accordance with the same method as in Example 5, but changing herein the mixing ratios of the positive electrode active material particles and polyacrylonitrile.

Examples 7 and 8, and Comparative Example 7

The positive electrode materials of Examples 7 and 8, and Comparative example 7, were obtained in accordance with the same method as in Example 5, but using herein methyltrimethoxysilane, at predetermined mixing ratios, instead of polyacrylonitrile.

Measurement of Internal Void Diameter of Positive Electrode Materials

Cross-sectional electron micrographs of the produced positive electrode materials of the examples and comparative examples were captured using a TEM device "JEM-ARM300F" (by JEOL Ltd.). Imaging conditions involved acceleration voltage set to 200.0 kV and measurement magnifications set to 10,000×.

The area of the voids in the interior of particles was calculated using the image analysis software "ImageJ-fiji" on cross-sectional images of the obtained positive electrode materials. A respective circle equivalent diameter D was determined, from the above area, on the basis of the expression for the area of the circle: $(D/2)^2 \times \pi$. A graph was created with the circle equivalent diameter D in the horizontal axis and area frequency in the vertical axis, and the value of the circle equivalent diameter at the peak of area frequency was taken as the average diameter of the internal voids of the positive electrode active material particles. The results are given in Table 1.

Evaluation of N Content and Si Content in Positive Electrode Material

Each produced positive electrode material in the examples and comparative examples above was placed in sample pan made of aluminum, within a glove box, and was pressed using a tablet molding machine, to produce a measurement sample. Each measurement sample was affixed to an XPS analysis holder and was subjected to an XPS measurement under the conditions below, using an XPS analyzer "PHI 5000 VersaProbe II" (by ULVAC-PHI, Inc.). A compositional analysis of the elements to be measured was carried out, and the proportion of each element was calculated as "atomic %". The results are given in Table 1.

The proportion (atom %) of nitrogen atoms included in the nitrile group-containing polymer relative to metal atoms included in the positive electrode active material particles, other than lithium, was determined using the calculated values, on the basis of the following expression: $\{N/(Ni+Co+Mn)\} \times 100$.

The proportion (atom %) of Si atoms included in the alkoxysilane compound relative to metal atoms included in the positive electrode active material particles, other than lithium, was determined using the calculated values, on the basis of the following expression: $\{Si/(Ni+Co+Mn)\} \times 100$.

The results are given in Table 1.

Measurement Conditions

X-ray source: AlKα monochromatic light
Irradiation range: ϕ100 μmHP (1400×200)
Current voltage: 100 W, 20 kV
Neutralizing gun: ON
Pass energy: 187.85 eV (wide), 46.95-117.40 eV (narrow)
Step: 0.4 eV (wide), 0.1 eV (narrow)
Shift correction: C—C, C—H (C1s, 284.8 eV)
Peak information: Handbook of XPS (ULVAC-PHI)

Production of Lithium Secondary Batteries for Evaluation

Pastes for forming respective positive electrode active material layers were prepared through mixing of the positive electrode materials of the examples and comparative examples, acetylene black (AB) as a conductive material, and polyvinylidene fluoride (PVDF) as a binder, at a mass ratio of positive electrode material:AB:PVDF=94:3:3, in N-methylpyrrolidone (NMP). Each paste was applied on both faces of an aluminum foil, using a film applicator by Allgood Co., Ltd., and was dried at 80° C. for 5 minutes, to produce a respective positive electrode sheet.

Natural graphite (C) as a negative electrode active material, styrene butadiene rubber (SBR) as a binder and carboxymethyl cellulose (CMC) as a thickener were mixed at a mass ratio of C:SBR:CMC=98:1:1 in ion-exchanged water, to prepare a paste for forming a negative electrode active material layer. This paste was applied on both faces of a copper foil, using a film applicator by Allgood Co., Ltd., and was dried at 80° C. for 5 minutes, to produce a negative electrode sheet.

Two porous polyolefin sheets having a three-layer structure of PP/PE/PP were prepared as separator sheets.

Each produced positive electrode sheet, the negative electrode sheet, and the prepared two separator sheets were laid up on each other and were wound, to produce a respective cylindrical wound electrode body. Respective electrode terminals were welded to the positive electrode sheet and to the negative electrode sheet of each produced wound electrode body, and the resulting wound electrode body was accommodated in a battery case having a filling port.

A nonaqueous electrolyte solution was injected next through the filling port of the battery case, and the filling port was sealed hermetically. As the nonaqueous electrolyte solution, a solution was used which was obtained by dissolving $LiPF_6$ as a supporting salt, to a concentration of 1.0 mol/L, in a mixed solvent that contained ethylene carbonate (EC), dimethyl carbonate (DMC) and ethyl methyl carbonate (EMC) at a volume ratio of 3:4:3.

Lithium ion secondary batteries for evaluation of the examples and comparative examples were obtained thus as described above.

Activation and Initial Capacity Measurement

Each produced lithium secondary battery for evaluation was placed in an environment at 25° C. In accordance with a constant current-constant voltage scheme, each lithium ion secondary battery for evaluation was charged at constant current up to 4.1 V, at a current value of ⅓ C, and was then charged at constant voltage up to a current value of 1/50 C, to bring about a fully charged state. Thereafter, the lithium ion secondary battery for evaluation was discharged at constant current down to 3.0 V, at a current value of ⅓ C. The discharge capacity at that time was measured, to determine the initial capacity. The lithium secondary battery for evaluation was then charged up to 3.7 V, and thereafter was allowed to stand at 60° C. for 9 hours.

Low-Temperature Resistance Measurement

Each activated lithium ion secondary battery for evaluation was adjusted to an open-circuit voltage of 3.70 V. The adjusted battery was placed in a temperature environment at −10° C. The battery was discharged for 10 seconds at a current value of 1 C, and a voltage change amount ΔV was determined. Battery resistance was calculated using the current value and ΔV. Taking the resistance of the lithium secondary battery for evaluation of Comparative example 1 as 100, ratios for resistance of the lithium secondary batteries for evaluation of the other comparative examples and examples were determined. The results are given in Table 1.

Evaluation of High-Temperature Cycle Characteristics

Each activated lithium secondary battery for evaluation was placed in an environment at 60° C., and was subjected to 200 repeated cycles of charge and discharge, each cycle involving constant-current charging at 2 C up to 4.1 V and constant-current discharge at 2 C down to 3.0 V. The discharge capacity at the 200-th cycle was determined in accordance with the same method as that of initial capacity. Then a capacity retention rate (%), as an index of high-temperature cycle characteristics, was determined as (discharge capacity at 200-th cycle of charge and discharge/initial capacity)×100. The results are given in Table 1.

TABLE 1

| | Average void diameter (μm) | N (atom %) | Si (atom %) | Low-temperature resistance ratio | Capacity retention rate (%) |
|---|---|---|---|---|---|
| Comparative example 1 | <0.01 | 0 | 0 | 100 | 80 |
| Comparative example 2 | 0.01 | 0 | 0 | 98 | 81 |
| Example 1 | 0.01 | 1 | 0 | 95 | 85 |
| Example 2 | 0.01 | 10 | 0 | 93 | 87 |
| Comparative example 3 | 0.01 | 15 | 0 | 103 | 77 |
| Example 3 | 0.01 | 0 | 1 | 92 | 87 |
| Example 4 | 0.01 | 0 | 10 | 94 | 86 |
| Comparative example 4 | 0.01 | 0 | 15 | 102 | 76 |
| Comparative example 5 | 1 | 0 | 0 | 97 | 80 |
| Example 5 | 1 | 1 | 0 | 95 | 84 |
| Example 6 | 1 | 10 | 0 | 93 | 88 |
| Comparative example 6 | 1 | 15 | 0 | 102 | 75 |
| Example 7 | 1 | 0 | 1 | 94 | 87 |
| Example 8 | 1 | 0 | 10 | 95 | 86 |
| Comparative example 7 | 1 | 0 | 15 | 104 | 76 |

The results of Table 1 reveal that low-temperature resistance is low, and capacity retention rate is high, in cases where the positive electrode active material particles have internal voids with an average diameter of not less than 0.01 μm and not more than 1 μm, a nitrile group-containing polymer or alkoxysilane compound is present at least within the voids, and the proportion of nitrogen atoms included in the nitrile group-containing polymer or of silicon atoms included in the alkoxysilane compound, relative to metal atoms included in the positive electrode active material particles, other than lithium, is not less than 1 atom % and not more than 10 atom %.

It is therefore found that the positive electrode material of a secondary battery according to the present embodiment allows reducing the low-temperature resistance of lithium secondary batteries. It is further found that the positive electrode material of a secondary battery according to the present embodiment allows enhancing the high-temperature cycle characteristics of lithium secondary batteries.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A lithium secondary battery, comprising:
a positive electrode including a positive electrode material, and a binder;
a negative electrode including a negative electrode active material; and
a nonaqueous electrolyte, wherein
the binder is polyvinylidene fluoride,
the negative electrode active material is graphite,
the positive electrode material includes positive electrode active material particles each having a void in the interior thereof, and a compound (A) present at least within the void,
the positive electrode active material particles are particles of a lithium-transition metal composite oxide containing at least one selected from the group consisting of Ni, Co and Mn as a transition metal element,
an average diameter of the void is not less than 0.01 μm and not more than 1 μm, and
the compound (A) is a nitrile group-containing polymer, and then the proportion of nitrogen atoms included in the nitrile group-containing polymer, relative to metal atoms included in the positive electrode active material particles, other than lithium, is not less than 1 atom % and not more than 10 atom %, or
the compound (A) is an alkoxysilane compound, and then the proportion of silicon atoms included in the alkoxysilane compound relative to metal atoms included in the positive electrode active material particles, other than lithium, is not less than 1 atom % and not more than 10 atom %.

2. The secondary battery according to claim 1, wherein the nonaqueous electrolyte contains a carbonate as a nonaqueous solvent.

3. The secondary battery according to claim 1, wherein the compound (A) is the alkoxysilane compound.

* * * * *